July 5, 1960
R. W. ANTHONY ET AL
2,943,383
BROACH
Filed June 17, 1957
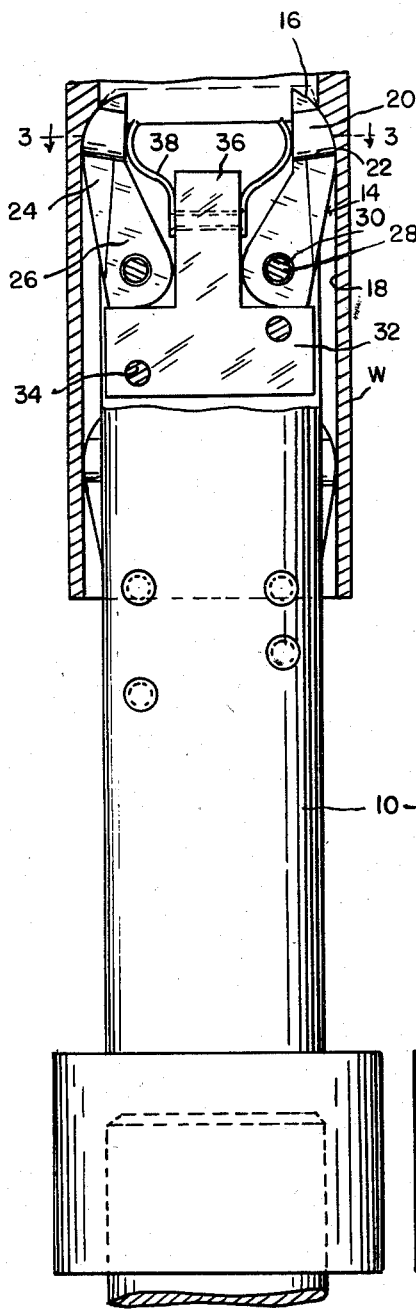
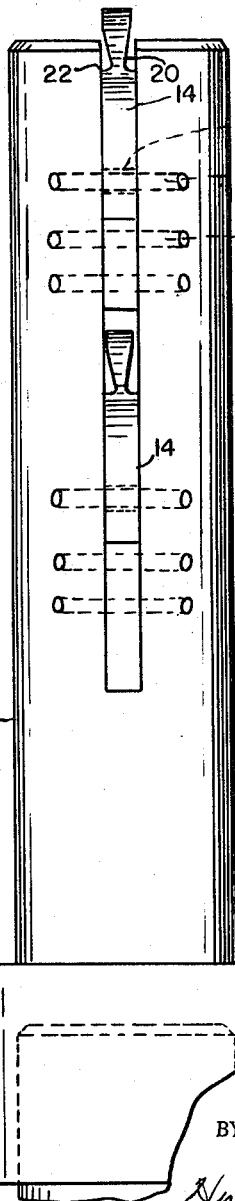
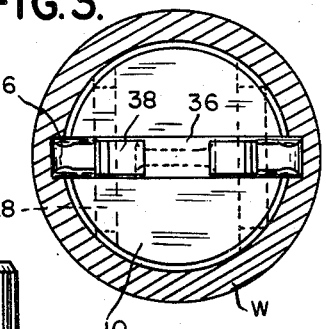
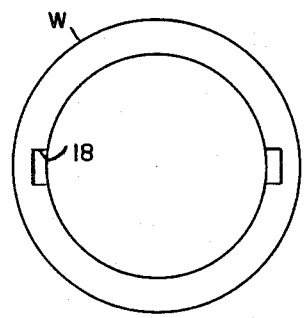
INVENTORS
RUSSEL W. ANTHONY
GEORGE H. RICKARD
BY
Whittemore,
Hulbert & Belknap
ATTORNEYS

United States Patent Office 2,943,383
Patented July 5, 1960

2,943,383
BROACH

Russel W. Anthony, Detroit, and George H. Rickard, East Detroit, Mich., assignors to National Broach & Machine Company, Detroit, Mich., a corporation of Michigan Filed June 17, 1957, Ser. No. 666,020

1 Claim. (Cl. 29—95.1)

The present invention relates to a broach, and more particularly to a broach designed to broach the sides of a previously formed double blind keyway at the interior of a tubular work piece.

It is an object of the present invention to provide a broach capable of broaching the sides of a double blind keyway and of retraction thereafter without injury to the cutting edges thereof.

More specifically, it is an object of the present invention to provide a broach having a plurality of pairs of movable broach teeth operable to take broaching cuts in a double blind keyway, resilient means urging the teeth outwardly into broaching position, said teeth being yieldable upon reaching the end of the blind keyway and yieldable also during retraction.

It is a further object of the present invention to provide a broach of the character described having pairs of movable broaching teeth, pivot means providing a loose pivot connection between the teeth and a holder, and rigid abutment means engageable by the teeth during a cutting operation to take up the cutting thrust.

Other objects and features of the invention will become apparent as the description proceeds, especially when taken in conjunction with the accompanying drawing, illustrating a preferred embodiment of the invention, wherein:

Figure 1 is a fragmentary side elevational view with parts in section, showing the broach engaged in its cutting operation.

Figure 2 is a side elevational view of the broach taken at 90 degrees from Figure 1.

Figure 3 is a sectional view taken on the line 3—3, Figure 1.

Figure 4 is an end view of the completed work piece.

The present broach was designed for the purpose of taking broaching cuts at the sides of diametrically opposed blind keyways at the interior of a tubular work piece.

The broach comprises a holder 10 of cylindrical configuration provided with a longitudinally extending slot 12 extending diametrically completely therethrough. Mounted within the slot 12 are a plurality of pairs of broach teeth or cutters 14. Each tooth 14 is provided with a rounded nose portion 16 the lateral surface of which is engageable with the bottom surface of the keyway 18 in the work piece W. Opposite sides of the nose portion of the cutters 14 are ground as indicated at 20 to provide cutting edges at 22 adapted to take cuts at the sides of the keyways 18.

Inasmuch as the succeeding pair or pairs of cutters are adapted to take cuts, as for example .002 inch deep, the leading pair or pairs of cutters will be appropriately relieved in the area designated 24 so that the slot 12 may be of continuous width and the inner portions 26 of cutters fit properly therein.

Each of the cutters 14 is provided with a pivot mounting comprising a pivot pin 28 extending across the slot 12 and into the portions of the holder 10 at opposite sides thereof. The cutters 14 are provided with openings 30 which are slightly oversize relative to the pins 28 so that the cutters 14 are loosely mounted for pivotal movement.

Associated with each pair of cutters 14 is a block 32 riveted or otherwise rigidly secured within the slot 12 as indicated at 34. Conveniently, the block 32 is T-shaped and the stem portion 36 of the T extends into the space between cutters 14 of a single pair. The portion 36 has light leaf springs 38 secured thereto and engageable with inner surfaces of the nose portions 16 of the cutters 14.

The block 32 includes a cross portion underlying the inner ends of the cutters 14, as best illustrated in Figure 1. The arrangement is such that during a cutting operation the looseness or lost motion provided between the pins 28 and the openings 30 is sufficiently great so that the cutting thrust moves the cutters 14 into abutment with the cross and stem portions of the block 32, as clearly shown in Figure 1. This relieves the pivot pins 28 from the cutting thrust.

It will be observed that in the position of parts illustrated in Figure 1 the leading pair of cutters 14 is just about to be moved inwardly by engagement between the curved nose portions thereof and the rounded end surfaces at the inner ends of the keyways 18. This permits the following pair or pairs of cutters to continue their cuts to the end of the keyway, and as each succeeding pair reaches the end of the keyway it is in effect cammed inwardly into inoperative position.

The foregoing arrangement has the additional advantage that it prevents dragging the cutting edges back over the previously cut surfaces of the work piece. The cutters are yieldable and the strength of the springs 38 is only sufficient to move the cutters outwardly to cutting position. In cutting position it will be observed that the cutting thrust tends to rotate the cutters further outwardly so that the springs 38 are not required for the cutting operation. Thus, if excessive drag between any pair of cutters and the surface of the keyways develops during retraction of the broach, the cutters simply swing inwardly. Alternatively of course, if desired the retraction of the broach may be accompanied by slight rotation so that the cutters are moved out of alignment with the previously broached keyways.

The drawing and the foregoing specification constitute a description of the improved broach in such full, clear, concise and exact terms as to enable any person skilled in the art to practice the invention, the scope of which is indicated by the appended claim.

What we claim as our invention is:

A tool comprising a body having a slot formed therein, a pivot pin extending transversely of said slot, a cutting tooth pivotally mounted on said pin and having an enlarged pin receiving opening to provide for appreciable movement of said tooth transversely of said pin, a pair of angularly disposed abutment surfaces in said slot adjacent said pin, said tooth having surface portions engageable with both of said surfaces including a shoulder portion engageable with one of said surfaces to limit outward swinging movement of said tooth relative to said slot, said tooth having a cutting portion movable outwardly of said slot into cutting position, and resilient means engaging said tooth and effective to urge said tooth outwardly of the slot into cutting position.

References Cited in the file of this patent

UNITED STATES PATENTS

| | | |
|---|---|---|
| Re. 5,277 | Ettenborough | Feb. 11, 1873 |
| Re. 9,738 | Prindle | June 7, 1881 |
| 807,174 | Jones | Dec. 12, 1905 |
| 1,067,285 | Torney | July 15, 1913 |
| 1,070,750 | Thumm | Aug. 19, 1913 |
| 1,323,736 | Boucher | Dec. 2, 1919 |
| 1,382,939 | Spade | June 28, 1921 |
| 1,436,826 | Schmidt | Nov. 28, 1922 |
| 1,714,570 | Roebbel | May 28, 1929 |
| 1,910,118 | McCune | May 23, 1933 |
| 1,982,425 | Glasson | Nov. 27, 1934 |
| 2,427,843 | Dugger | Sept. 23, 1947 |
| 2,596,695 | Keller | May 13, 1952 |

FOREIGN PATENTS

| | | |
|---|---|---|
| 13,393 | Sweden | Nov. 2, 1899 |